United States Patent
Kobayashi

(10) Patent No.: US 7,453,522 B2
(45) Date of Patent: Nov. 18, 2008

(54) VIDEO DATA PROCESSING APPARATUS

(75) Inventor: Takero Kobayashi, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 575 days.

(21) Appl. No.: 11/099,455

(22) Filed: Apr. 6, 2005

(65) Prior Publication Data

US 2005/0265688 A1     Dec. 1, 2005

(30) Foreign Application Priority Data

May 26, 2004   (JP)   ............................. 2004-156234

(51) Int. Cl.
*H04N 9/74* (2006.01)
(52) U.S. Cl. ........................ 348/584; 348/586; 348/589; 348/597
(58) Field of Classification Search ................. 348/584, 348/586, 588–589, 600, 447, 597–599; 345/113–115, 345/133; *H04N 9/74*
See application file for complete search history.

(56) References Cited

U.S. PATENT DOCUMENTS

| | | | |
|---|---|---|---|
| 6,243,143 B1 | 6/2001 | Hatalsky et al. | |
| 6,297,852 B1 | 10/2001 | Laksono et al. | |
| 6,357,047 B1 | 3/2002 | Kurtze et al. | |
| 6,473,132 B1 * | 10/2002 | Foss | ........................... 348/584 |
| 6,707,505 B2 * | 3/2004 | Kuo et al. | .................... 348/584 |
| 2004/0131276 A1 * | 7/2004 | Hudson | ....................... 382/276 |

FOREIGN PATENT DOCUMENTS

| CN | 1304615 A | 7/2001 |
|---|---|---|
| JP | 2000-307956 | 11/2000 |

* cited by examiner

*Primary Examiner*—Trang U Tran
(74) *Attorney, Agent, or Firm*—Oblon, Spivak, McClelland, Maier & Neustadt, P.C.

(57) ABSTRACT

When one video image (e.g., second video image) is blended or synthesized to video image (e.g., main video image), time base correction is made between both video data. A video data processing apparatus comprising a first video generator generating a first video data having an arbitrary frame rate, a second video generator generating a second video data having an arbitrary frame rate different from the first video data, and a synchronization controller using video reproduction time managed by the first video generator as a reference time, and correcting video reproduction time of the second video generator shifted from the reference time by repeatedly using the second video data to obtain frame synchronization.

9 Claims, 9 Drawing Sheets

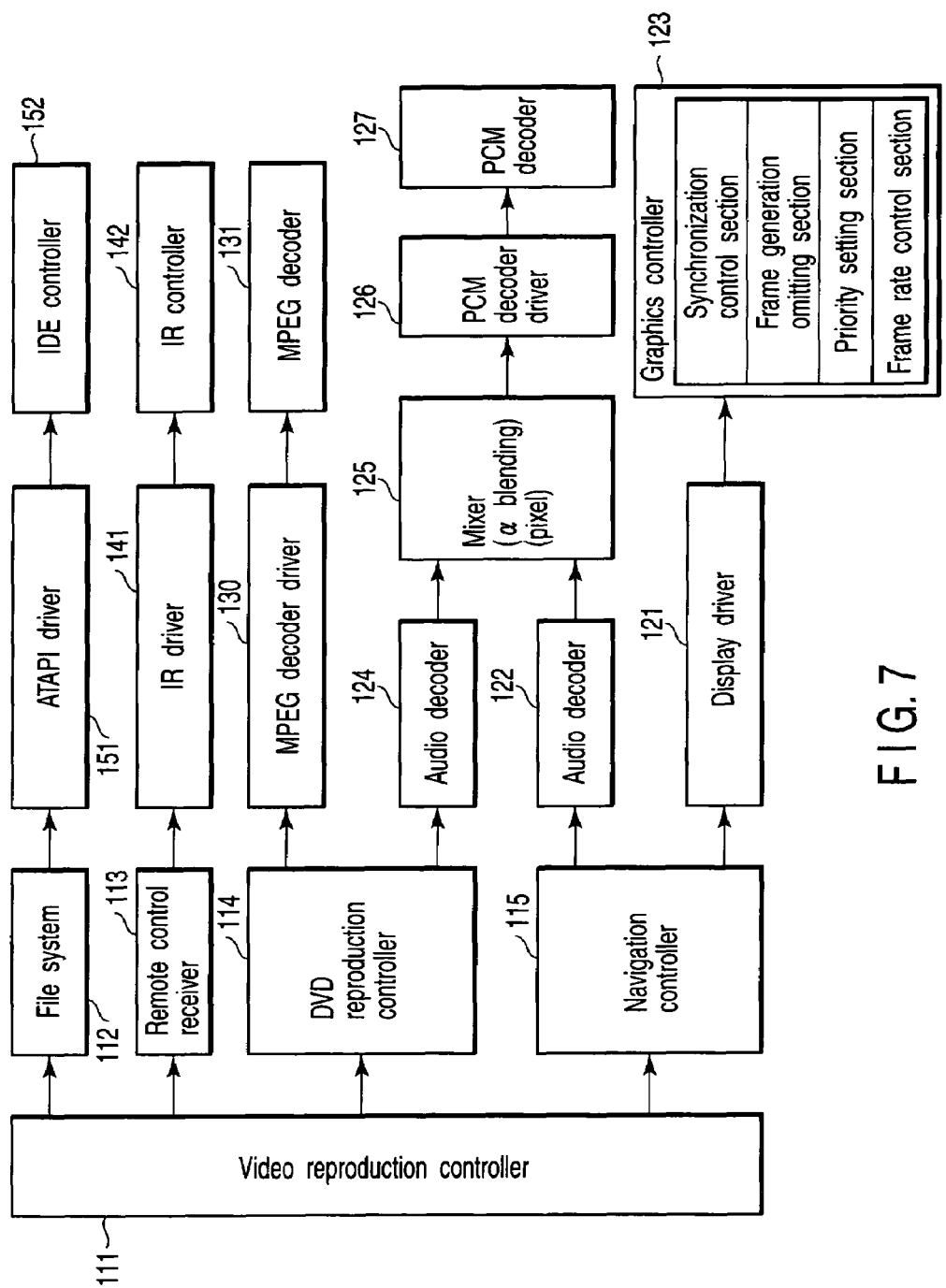
F I G. 7

VIDEO DATA PROCESSING APPARATUS

CROSS-REFERENCE TO RELATED APPLICATIONS

This application is based upon and claims the benefit of priority from prior Japanese Patent Application No. 2004-156234, filed May 26, 2004, the entire contents of which are incorporated herein by reference.

BACKGROUND OF THE INVENTION

1. Field of the Invention

The present invention relates to a technique of synthesizing or blending several video data. In particular, the present invention relates to video data processing apparatus and method, which have improvement in time base correction between several video data.

2. Description of the Related Art

There has been conventionally known a technique of synthesizing several video data. In many cases, first and second video data thus synchronized are a video data including a synchronizing signal having the same frequency inherently. Moreover, the following method is given as a technique of multiplexing a still image, that is, the second video data to the first video data as a moving image. According to the method, the second video data (e.g., OSD signal) is multiplexed after read from a memory (see JPN. PAT. APPLN. KOKAI Publication No. 2002-165018). In this case, the read timing of the second video data is preset to a predetermined timing of the first video data. It is presumed that the first and second video data are reproduced using a hardware circuit.

In the display area of a moving image, that is, main video image, the following display is desired in order to obtain various and plentiful expressions. More specifically, the main video image is displayed in a state that a second video image is matched thereto as a time zone event. For example, screen effect is desired such that the moving image, that is, main video image is matched to the second video image to change each transmittance of the main and second video images. Moreover, if the main video image is a motion picture (movie), it is desired to display translated texts in synchronous with the movie character's words.

In this case, the following matter should be considered. More specifically, the second video image has a video source reproduced using software, and not a video source processed using hardware like the conventional case. If the video source of the second video image is reproduced using the software, the reproduction time depends on a reference clock of a computer. Therefore, a frame rate of the second video image does not necessarily match with that of the main video image reproduced using another hardware. There is no problem so long as the second video image reproduced using the software is simply framed and displayed in a rectangular area of part of the moving image, that is, the main video image regardless of a change of the main video image.

However, there has not been disclosed a technique of closely relating display contents of main and second video images, and synchronizing the frame rates of the both.

BRIEF SUMMARY OF THE INVENTION

An object of the embodiments is to provide video data processing apparatus and method, which can make time base correction of two video data when one video image (e.g., main video image) is blended or synthesized with the other video image (e.g., second video image).

In order to achieve the foregoing object, according to one aspect of the present invention, there is provided a video data processing apparatus comprising: first video generator means for generating a first video data having an arbitrary frame rate; a second video generator means for generating a second video data having an arbitrary frame rate different from the first video data; and means for using video reproduction time managed by the first video generator as a reference time, and correcting video reproduction time of the second video generator shifted from the reference time by repeatedly using the second video data to obtain frame synchronization.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 7 is a block diagram showing the configuration of software for realizing the present invention;

DETAILED DESCRIPTION OF THE INVENTION

Embodiments of the present invention will be described below with reference to the accompanying drawings.

Figure 1:
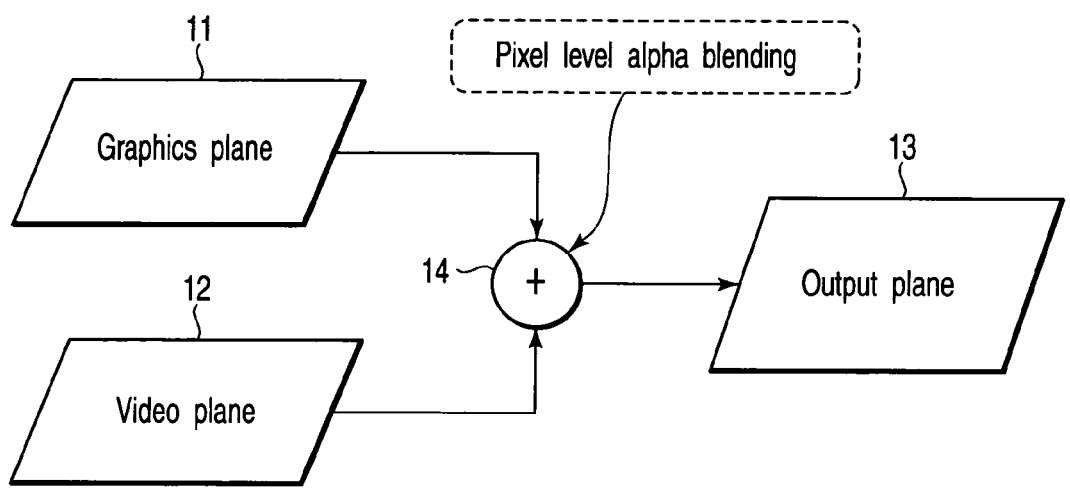
FIG. 1 is a view to explain image plane blending handled in the present invention.

FIG. 1 is a view to explain the basic principle of image plane blending handled in the present invention. A graphics plane 11 is an image computed and generated by a central processing unit (CPU). A video plane 12 is a sheet image of a moving image decoded by an MPEG2 decoder. The foregoing graphics and video planes 11 and 12 are generated separately from each other. For example, the graphics and video planes 11 and 12 are periodically blended in synchronous with an output frame rate of the MPEG2 decoder. A synchronizer 14 carries out the preceding blending; in other words, pixel level alpha blending is carried out.

Figure 2:
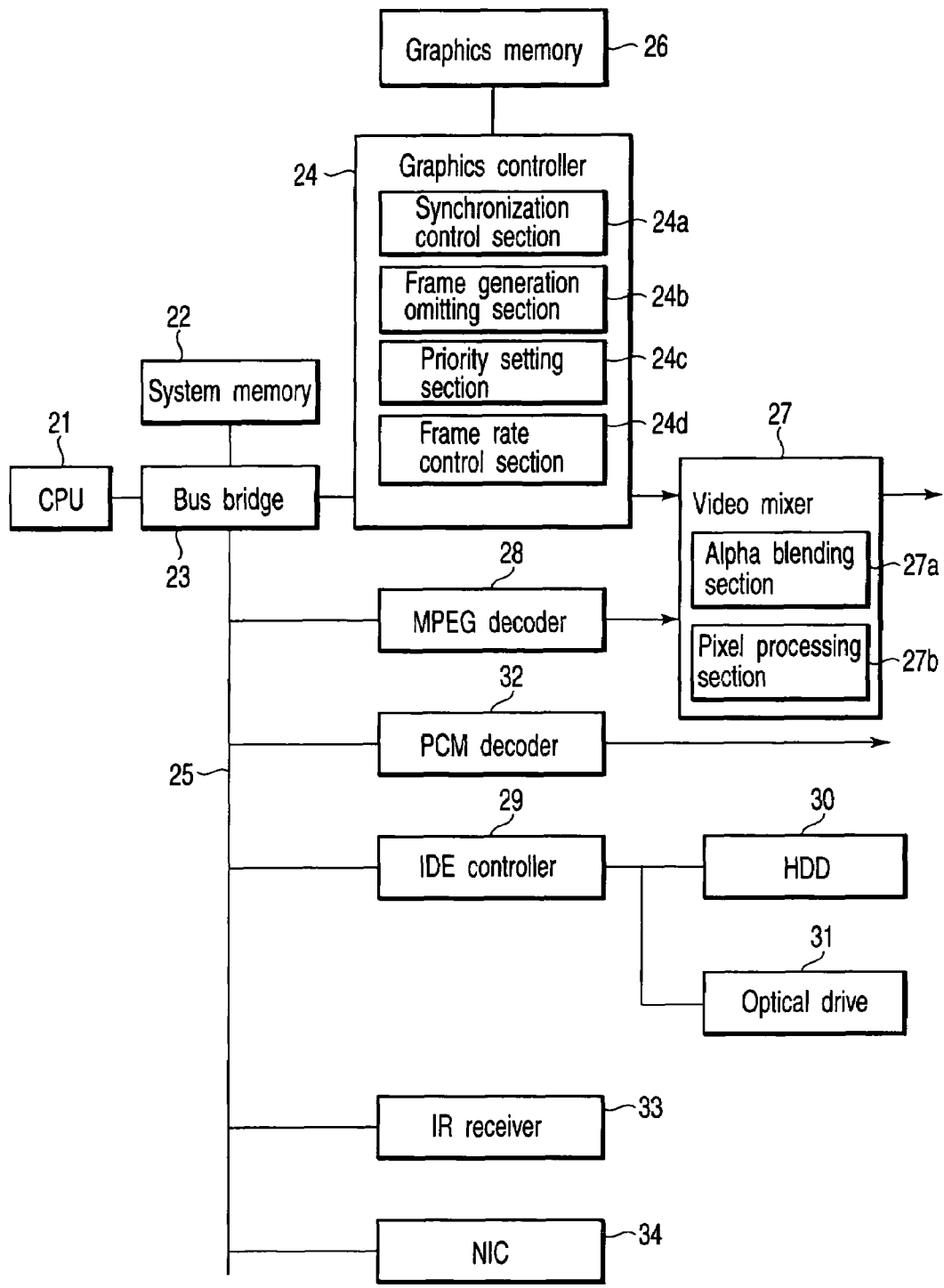
FIG. 2 is a block diagram showing the configuration of an apparatus (hardware) according to the present invention.

FIG. 2 is a block diagram showing the configuration of hardware according to the present invention. A CPU 21 controls various devices connected to a system according to executable programs loaded onto a system memory 22, and generates a graphics output image.

A bus bridge 23 is connected with CPU 21, system memory 22, graphics controller 24 and PCI bus 25, and controls and relays a data exchange between various devices and buses.

The system memory 22 stores a copy of executable programs stored in a hard disk drive (HDD) 30 connected to an IDE controller 29. Moreover, the system memory 22 is used as a buffer area for temporarily storing variables required for computation and data transfer.

The graphics controller 24 controls a transfer of image computed by the CPU 21 from the system memory 2 to a graphics memory 26. Moreover, the graphics controller 24 executes complicated image processing computations according to the instructions from the CPU 21. In addition, the graphics controller 24 outputs image information to a video mixer 27 in synchronous with an output timing of an MPEG decoder 28. Thus, the graphics controller 24 includes a synchronization control section 24a. The graphics controller 24 further includes frame generation omitting section 24b, priority setting section 24c, frame rate control section 24d, which will be described later.

The video mixer 27 blends (mixes) NTSC signal information from the MPEG decoder 28 and image information from the graphics controller 24. In this case, the video mixer 27 carries out the foregoing mixing using a α (alpha) value included in the image information from the graphics controller 24. Then, the video mixer 27 reproduces an image signal synchronous with the NTSC signal, and thereafter, outputs it. The video mixer 27 includes an alpha blending section 27a. The video mixer 27 further includes a pixel processing section 27b for carrying out blending (synthesizing) at a pixel level described later.

The MPEG decoder 28 captures MPEG2 data extracted from data read from an optical drive 31 based on the control of the CPU 21, and converts it into image data. Thereafter, the MPEG decoder 28 outputs the converted image data to the video mixer 27.

A PCM decoder 32 periodically captures PCM data converted by the computation of the CPU 21 from audio data extracted from data read from the optical drive 31. Thereafter, the PCM decoder 32 converts the captured PCM data into an analog sound signal to output the signal.

The IDE controller 29 is connected with the optical drive 31 and the HDD 30, and carries out control for reading data included in each drive to the memory based on the control of the CPU 21.

The optical drive 31 is a DVD drive, for example. The optical drive 31 reads data from a DVD disk stored with data for generating video and graphics planes 12 and 11.

The HDD 30 stores executable programs for operating this apparatus. An IR receiver 33 receives a signal from a remote controller for controlling this apparatus. A network interface controller (NIC) 34 controls communication data for making a connection with various networks.

Figure 3:
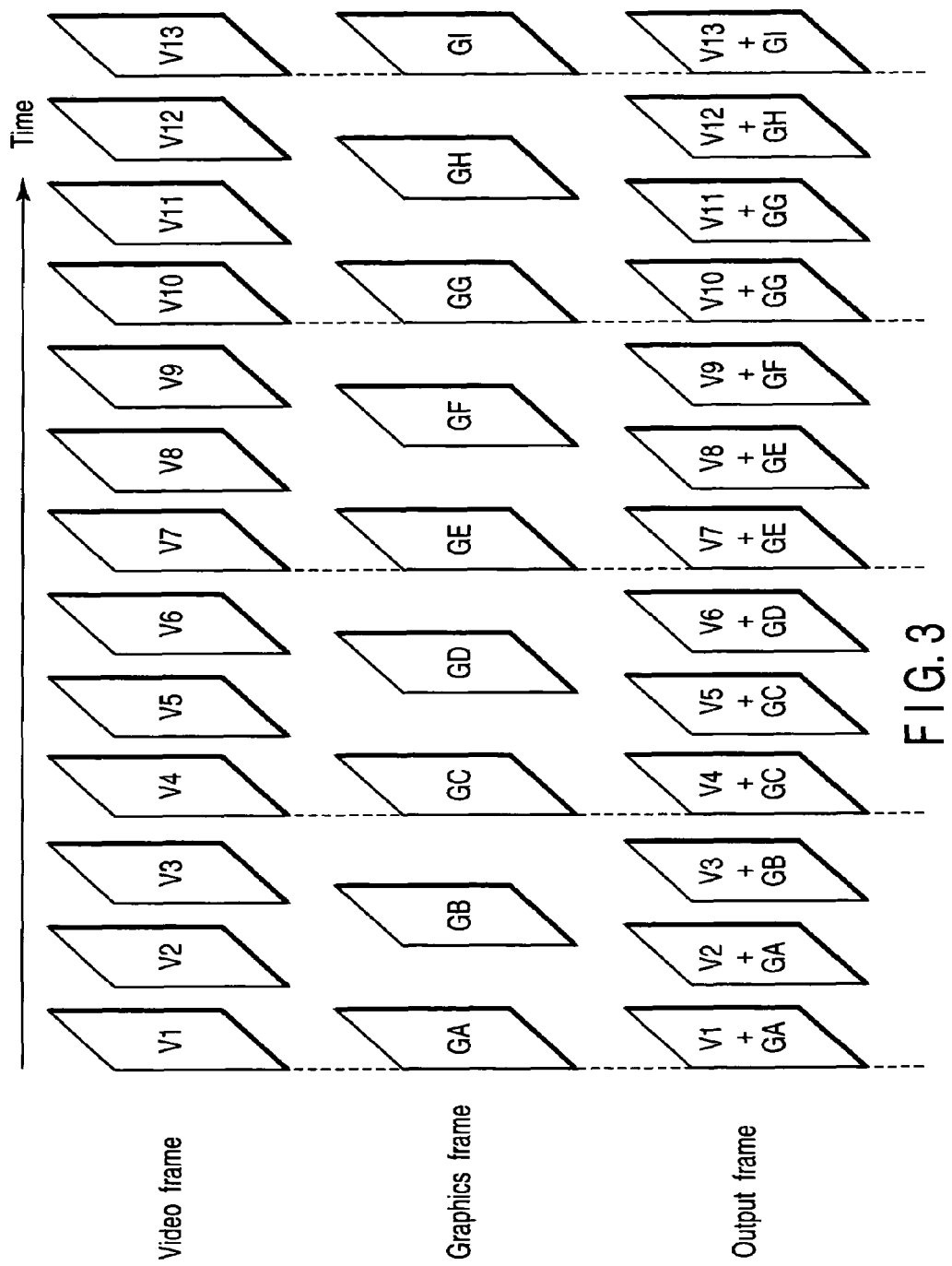
FIG. 3 is a view to explain the operation of the apparatus according to the present invention, that is, blending of a graphics frame with a video frame.

FIG. 3 is a view to explain the operation of blending a graphics frame with a video frame. The present invention is adaptable even if a frame rate is different between video frames V1, V2, V3, . . . V13 and graphics frames GA, GB, GC, . . . G1. FIG. 3 shows the case where the video frame advances four frames while the graphics frame advances three frames. An output frame is synchronized with a frame rate of the video frame. If output timing shifts between the video frame and the graphics frame, a graphics frame generated before output frame is blended with the video frame. More specifically, from the relation between the video frame V1 and the graphics frame GA, an output frame (V1+GA) blending the both frames is obtained. In the next output frame, an output frame (V2+GA) blending the video frame V2 with the graphics frame GA is obtained. In the next output frame, an output frame (V2+GB) blending the video frame V3 with the graphics frame GB is obtained. In the next output frame, the video frame V4 and the graphics frame GC are synchronized in the time base; therefore, an output frame (V4+GC) blending the both frames is obtained. The frame blending (synthesis) described above is repeatedly made. In this case, the graphics controller 24 makes a comparison of the frame rate between video and graphics frames, and determines which of these frames advances. The number of times repeatedly using the same graphics frame may be changed in accordance with the frame rate value of the video and graphics frames.

As described above, the same graphics frame is blended (synthesized) to the continuous video frame of the first video data several times, thereby offsetting the difference between frame rates. Moreover, if the generation of the graphics frame is delayed, the number of times synthesizing the same graphics frame to the continuous video frame may be increased.

As described above, the apparatus of the present invention has a first video generator for generating first video data (video frame) having an arbitrary frame rate. The first video generator includes optical drive 31, IDE controller 29, MPEG decoder 28 and video mixer 27. Moreover, the apparatus of the present invention has a second video generator for generating second video data (graphics frame) having an arbitrary frame rate different from the first video data. The second video generator includes CPU 21, system memory 22, bus bridge 23, graphics memory 26 and graphics controller 24. Video generation time managed by the first video generator is determined as reference time. If a shift from the reference time occurs in video generation time of the second video generator, the shift is corrected by repeatedly using the second video data, and thereby, frame synchronization is obtained. In this case, the foregoing "shift" is a frame unit. However, the "shift" includes the case where the second video data is not generated in time to obtain frame blending (synthesis) although described later.

Figure 4:
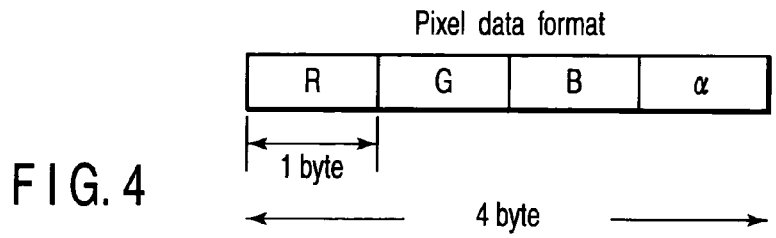
FIG. 4 is a view showing one example of a pixel data format.

FIG. 4 is a view showing one example of a pixel data format.

The pixel data format shows the structure of data for each pixel of the graphics frame. In FIG. 4, R, G, B and α denote red, green, blue and blending alpha value, respectively. These R, G, B and α each have one byte; therefore, the data comprises four bytes in total.

Figure 5:
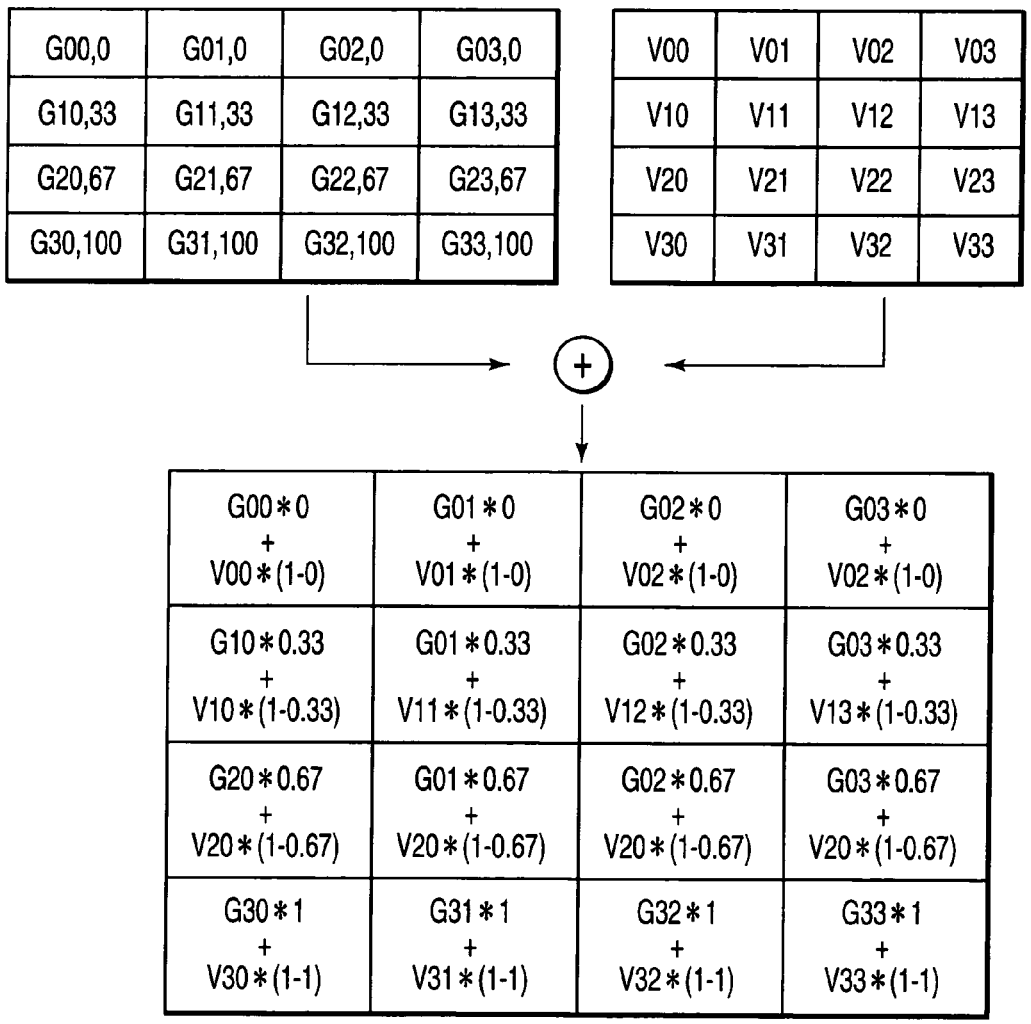
FIG. 5 is a view to explain the principle of blending at a pixel rate.

FIG. 5 is a view showing a pixel blending computation at a pixel level. In FIG. 5, G00,0 to G33,100 each express a pixel value of the graphics frame, and the numerical value before comma shows an RGB value at a pixel position while the numerical value after comma shows an α value. V00 to V33 each express an RGB value of each pixel of the video frame.

In this case, the pixel value for each output frame is obtained in a manner of computing and blending graphics and video pixel values using a graphics alpha ratio.

In blending the graphics pixel G00,0 shown at the upper left of FIG. 5 with the video pixel V00, a computation of (G00×0)+(V00×(1−0)) is made. In this case, the graphics ratio is 0, and the video ratio is 1. Moreover, in blending the graphics pixel G10,33 with the video pixel V10, a computation of (G10×0.33)+(V10×(1−0.33)) is made.

The output from the video frame has luminance Y, color difference Cb and Cr signals. Therefore, in FIG. 2, the video mixer 27 converts the pixel value outputted from the graphics frame into Y, Cb and Cr, and thereafter, blends them.

Figure 6:
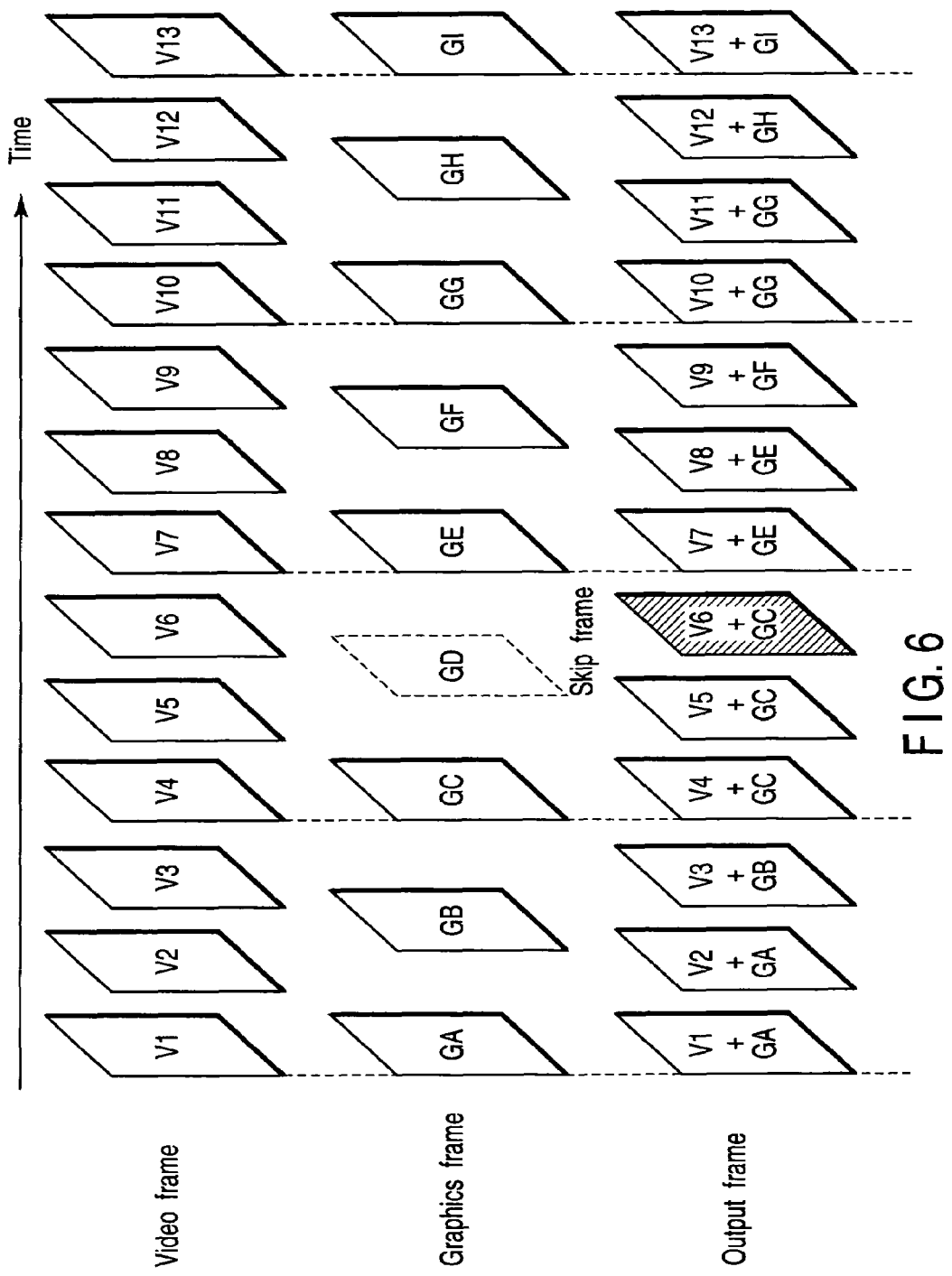
FIG. 6 is a view to explain the operation of the apparatus according to the present invention, that is, blending of a graphics frame with a video frame, and to explain the operation when skip is given.

FIG. 6 is a view to explain frame blending in the case where graphics frame computation has not been made in time. FIG. 6 shows the case where the generation of the graphics frame GD is delayed. In other words, according to the present invention, the graphics frame is reproduced based on software. Of the reproduced frames, there exist a frame, which must be reproduced based complicated blending (synthesis) and operation result. Such a frame requires much time to fully generate it. In addition, the graphics frame is not generated in time resulting from the reasons described below. More specifically, the system performance including the CPU is not sufficient, or the computation of specified graphics frame is very complicated.

From the foregoing reasons, time becomes un-matching between the graphics frame GD and the video frame V6 inherently corresponding thereto.

In such a case, the video frame is preferentially generated according to the present invention. FIG. 6 shows the case where the computation of a frame "GD" of the graphics frame is not made in time. In this case, the video frame "V6" is inherently blended with the graphics frame "GD", thereby generating an output frame. However, the video frame "V6" is blended with the graphics frame "GC" already generated, thereby generating an output frame.

Therefore, the apparatus of the present invention has a mechanism such that any of the first or second video generators preferentially performs video frame generation. If video generation by another video generator is not made in reproduction time of video generation made preferentially, the apparatus has a function of omitting a generation of the video frame, which is not generated in time. By doing so, it is possible to prevent a delay of reproduction time of another video data according to the advance of the reproduction time of video generation made preferentially. The video generation made preferentially is performed using hardware. In this case, the hardware comprises a semiconductor chip for pre-determined signal processing and electronic components, which are combined at a functional unit such as MPEG processing and PCM processing.

FIG. 7 is a functional block diagram showing the configuration of software for realizing the present invention. A video reproduction control section 111 is a module for controlling the operation of the software of the present invention. The control section 111 controls data read from a file system 112, user operation receipt from a remote control receiver 113 and the operations of DVD reproduction controller 114 and navigation controller 115. The DVD reproduction controller 114 controls video reproduction, and the navigation controller 115 controls graphics frame generation.

The navigation controller 115 generates a navigation image with respect to the graphics frame using navigation control data read from the file system 112. Moreover, the navigation controller 115 controls image output timing based on time information of the DVD reproduction controller 114 via a display driver 121. In addition, the DVD reproduction controller 114 controls an audio decoder 122 for outputting sound effect in accordance with user events.

The display driver 121 captures graphics frame data generated by the navigation controller 115, and controls a graphics controller 123 to output graphics frame data. Audio decoders 122 and 124 decode audio data supplied from the navigation controller 115 and the DVD reproduction controller 114. Then, these audio decoders 122 and 124 convert audio data into PCM data, and thereafter, output it to an audio mixer 125.

The audio mixer 125 blends (mixes) PCM data inputted from audio decoders so that the PCM data is converted one PCM output data, and thereafter, output it to a PCM decoder driver 126. The PCM decoder driver 126 supplies PCM data inputted from the audio mixer 125 to a PCM decoder 127 to control sound reproduction.

The DVD reproduction controller 114 captures DVD data read via the file system 112 to separate the DVD data into video data, sound data and other data, and thereafter, controls their reproduction. The MPEG decoder driver 130 supplies MPEG data inputted from the DVD reproduction controller 114 to the MPEG decoder 131. The driver 130 carries out control for outputting the MPEG data at proper timing. The remote control receiver 113 interprets remote control switch events given by the IR driver 141. Then, the receiver 113 gives the event information to the video reproduction controller 111 as a message. The IR driver 141 controls interruption of the IR controller 142, and makes a detection which switch of the remote controller is depressed. Then, the IR receiver 141 gives the information to the remote control driver. The file system 112 controls a file system of the HDD 30 and the optical driver 31.

The file system 112 controls an ATAPI driver 151. The ATAPI driver 151 controls the IDE controller 142 to read data from the foregoing HDD 30 and optical driver 31.

Figure 8:
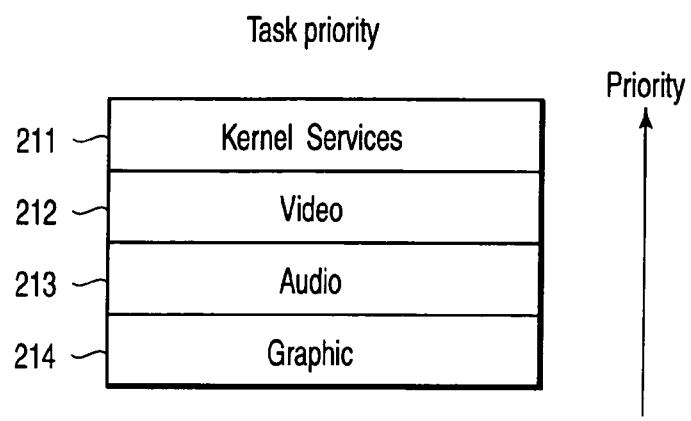
FIG. 8 is a view showing one example of task priority in executable programs.

FIG. 8 is a view to explain task priority of executable programs. According to the present invention, task priority is predetermined as shown in FIG. 8 in order to preferentially perform video reproduction on a multitask OS. More specifically, according to Kernel service 211, basic processings of the OS are executed, and task switch and access to the file system is controlled. According to video processing 212, video data is analyzed and extracted, and video and audio controllers are controlled. According to audio processing 213, blending of audio data and the output are controlled. According to graphics processing 214, navigation image data is generated.

The task priority shown in FIG. 8 is predetermined, and then, task switch is set so that if processing having higher priority is left, the processing is always preferentially executed. In this case, the task switch preferentially allocates a task to the Kernel service and video processing until they become idle. Then, the task switch allocates the tasks to audio and graphics processing only when the Kernel service and video processing become a state of waiting any event.

Figure 9:
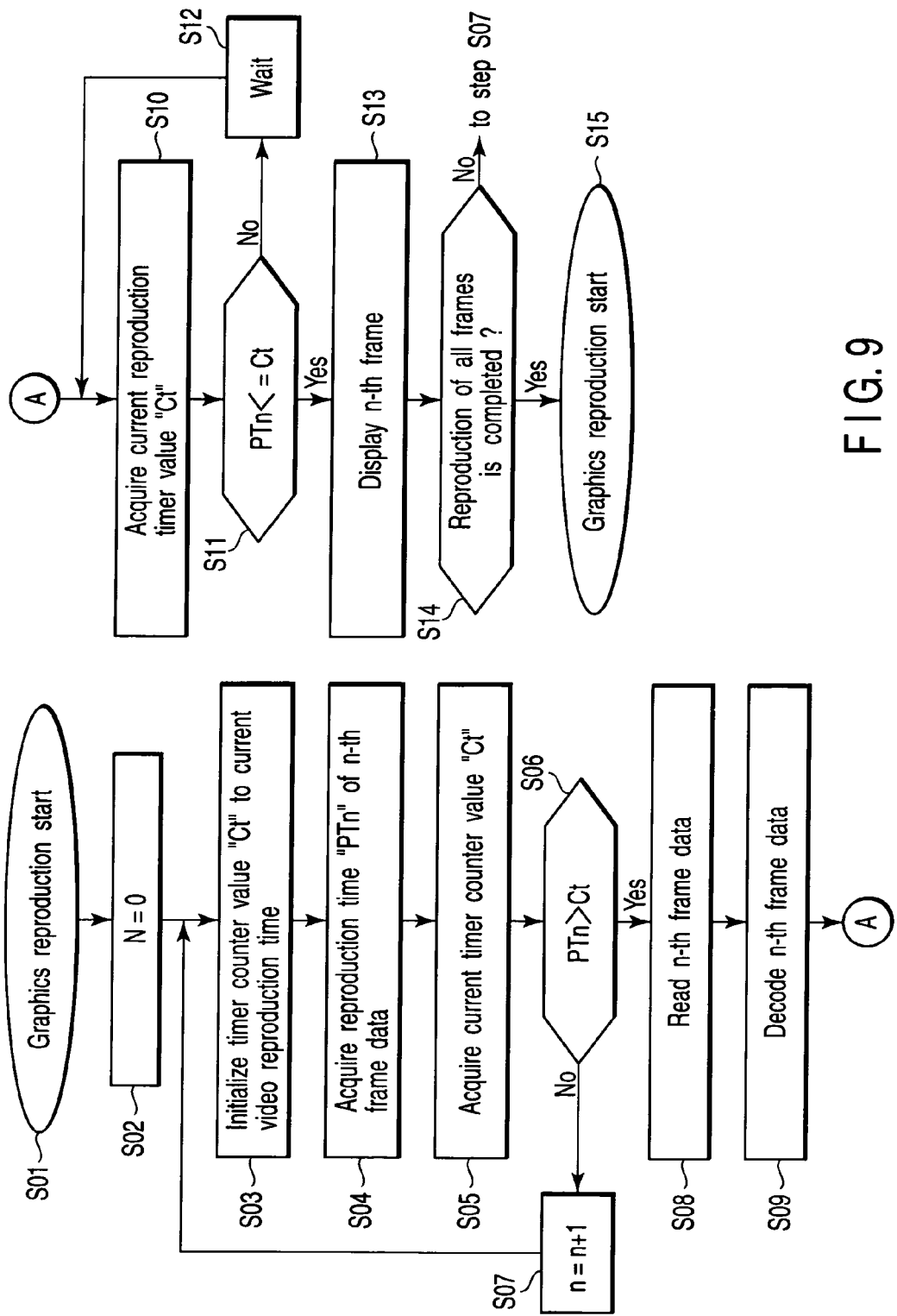
FIG. 9 is a flowchart to explain the flow of graphics reproduction procedures.

FIG. 9 is a flowchart to explain the flow of graphics reproduction. Step S01 is a start point of the flowchart, and shows graphics reproduction start. In step S02, a variable "n" storing a frame number of reproduced graphics is initialized to "0". In step S03, the value of an auto-increment graphics reproduction timer counter is initialized/corrected to a current reproduction time of an overlay target video.

In step S04, time information "PTn" reproducing an n-th frame of the graphics is acquired. In step S05, the current timer counter value "Ct" is acquired. In step S06, the following determination is made; namely, the reproduction time "PTn" of the n-th graphics frame is compared with the acquired timer counter value "Ct".

In step S07, if the reproduction time "PTn" of the n-th graphics frame is smaller than the acquired timer counter value "Ct"; in other words, if the video reproduction time already exceeds reproduction time, the procedure described below is taken. The n-th frame data is decoded and displayed in step S13, and thereafter, the value of reference frame number "n" is incremented by one.

In step S08, if the reproduction time "PTn" of the n-th graphics frame is larger than the acquired timer counter value "Ct"; in other words, if the current video reproduction time already exceeds the reproduction time of the n-th frame, the procedure described below is taken. Data required for generating the n-th graphics frame is acquired.

In step S09, the graphics frame data acquired in step S08 is decoded to image frame for screen display. In step S10, the current timer counter value "Ct" is acquired. In step S11, the following determination is made; namely, the reproduction time "PTn" of the n-th graphics frame is compared with the acquired timer counter value "Ct".

In step S12, if the timer counter value "Ct" is larger than the reproduction time "PTn" of the n-th graphics frame; in other words, if the current time does not reach the reproduction time of the n-th graphics frame, waiting time is given for slight period.

In step S13, if the reproduction time "PTn" of the n-th graphics frame is equal to or smaller than the timer counter value "Ct"; in other words, if the current time reaches or exceeds the reproduction time of the n-th graphics frame, the n-th frame is display on a screen. In step S14, it is determined whether or not all graphics frame processings are completed. Step S15, if all graphics frame processings are completed, the graphics reproduction procedure ends.

Figure 10:
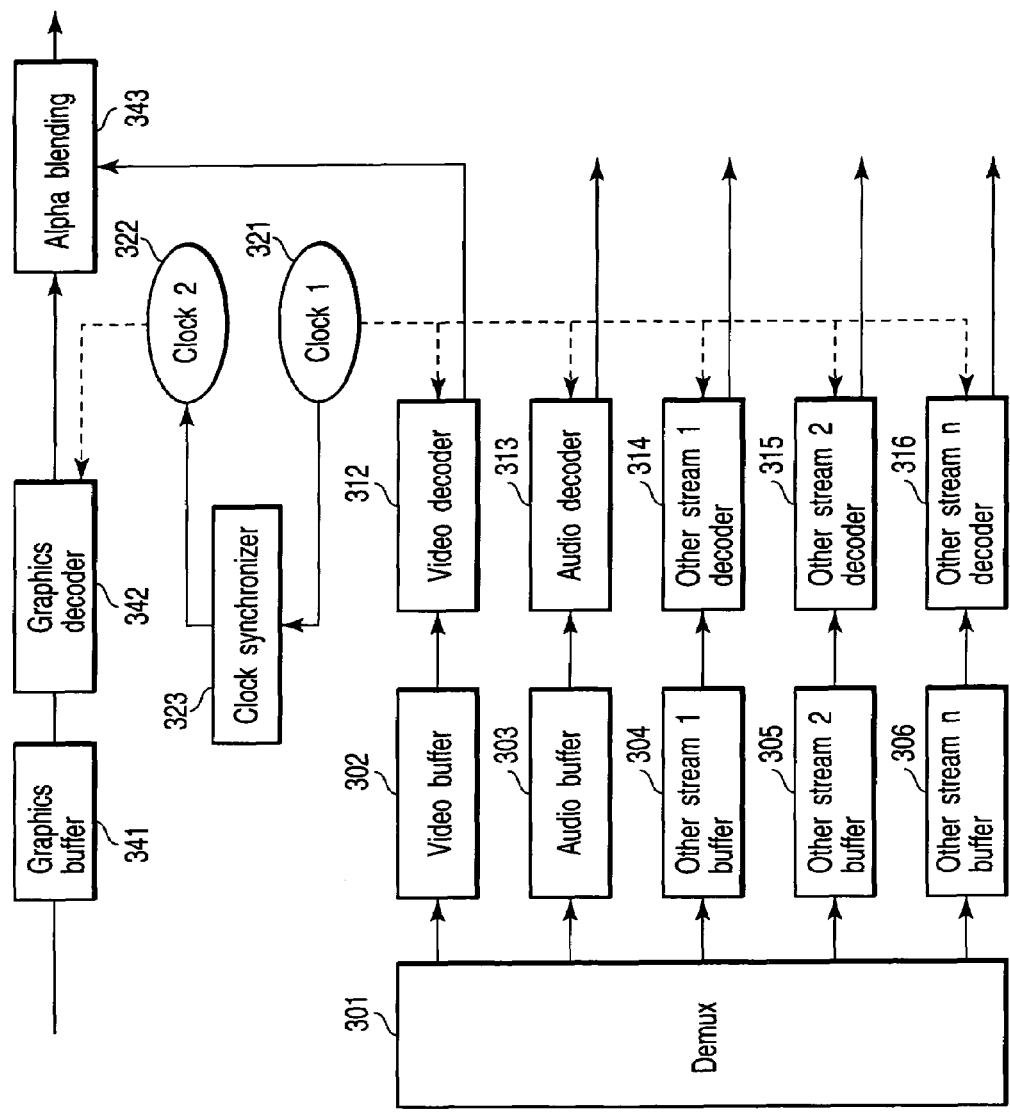
FIG. 10 is a view showing a time base correction system model according to the present invention.

FIG. 10 is a block diagram showing a time correction system model of the present invention. A de-multiplexer (De-mux) 301 extracts each data stream from one data stream multiplexing several data streams, and thereafter, supplies it to individual buffers.

A video buffer 302 temporarily stores main video data of separated data stream. An audio buffer 303 temporarily stores sound data reproduced synchronous with the main video of the separated data stream. Other stream 1 to n buffers 304, 305 and 306 temporarily stores other data streams. Another sound data and text data displayed synchronous with words of the main video are given as other data streams.

A video decoder 312 reads main video data stream from the video buffer 302, and decodes it to generate an image frame. When the time of a CLOCK1 321 reaches output time defined every image frame, decoded video data is outputted. An audio decoder 313 reads sound data stream from the audio buffer 303, and decodes it to generate PCM data. The PCM data is outputted after being converted into an analog sound output when the time of the CLOCK1 321 reaches output time defined every sound frame.

Other stream decoders 314 to 316 read data stream from buffers 304 to 306 corresponding to them, and decode it according to an output format defined by a arbitrary method. When the time of the CLOCK1 321 reaches output format defined by the arbitrary method, these stream decoders output decoded data.

A graphics buffer 341 temporarily stores data streams such as second video image and computer graphics. A graphic decoder 342 outputs a video frame and rewrites it to a new screen when the time of a CLOCK2 322 reaches output timing storing data streams such as second video image and computer graphics in the data stream.

The CLOCK1 321 is a reference timer used for outputting sound and other data appended to the main video image. On the other hand, the CLOCK2 322 is a reference timer different from the CLOCK1 321, which is used for outputting data streams such as second video image and computer graphics.

A clock synchronizer 323 has a function of synchronizing the advance of time between the CLOCK1 321 and the CLOCK2 322. An alpha blending 343 blends the outputs of the video decoder 312 and the graphic decoder 342 based on an α value included in the graphic decoder output, and thereafter outputs it. Other streams include second video stream confirmable to DVD.

The second video data (graphic data) stored in the graphic buffer 341 of the present invention is mainly data reproduced using software by a computer.

Figure 11:
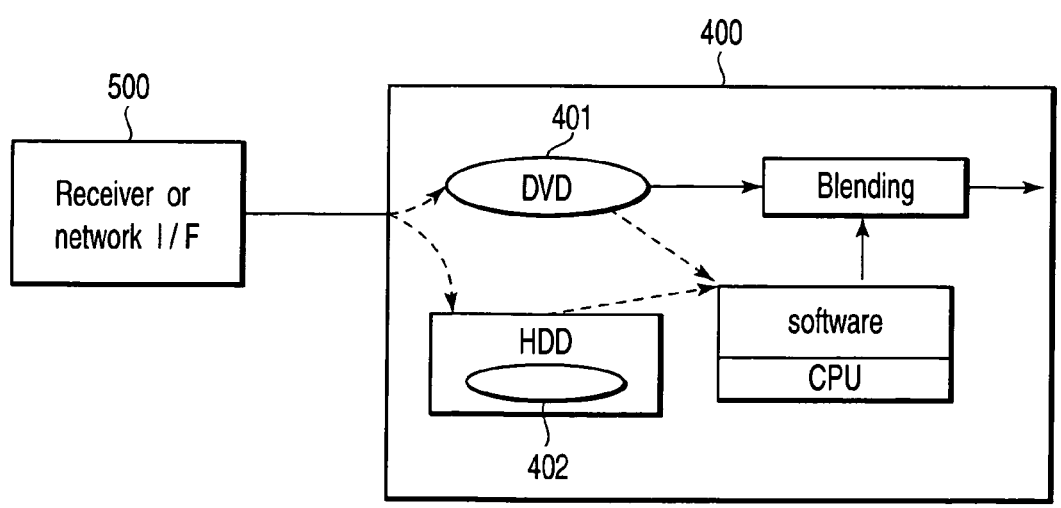
FIG. 11 is a view to explain an information recording/reproducing apparatus to which the present invention is applied.

FIG. 11 is a view to explain an information recording/reproducing apparatus to which the present invention is applied. An information recording/reproducing apparatus 400 shown in FIG. 11 records and reproduces information with respect to an optical disk 401. The apparatus 400 has a built-in hard disk drive; therefore, it records and reproduces information with respect to a hard disk 402.

Graphic information is captured via a receiver or network interface 500, and temporarily recorded to the optical disk 401 or hard disk 402. In this case, the graphic information is encoded or coded. Now, during information reproduction of the optical disk 401, a flag of reproducing graphic information and synthesizing it to main video image is detected. In this case, the flag is detected from management information (reproduction control information) of the optical disk 401. The graphic information is read from the optical disk 401 or hard disk 402, and then, the CPU is operated based on specified software to execute decoding (corresponding to 342 of FIG. 10). In this case, graphic data is reproduced using a system clock of the CPU; for this reason, it becomes an asynchronous state with the main video frame.

In such a case, the system of the present invention is operated to execute alpha blending. For example, according to the foregoing system (apparatus), it is possible to acquire Japanese subtitle second video with respect to a foreign sound disk (DVD) on the market. The Japanese subtitle second video information is temporarily recorded and stored in the hard disk. Then, a specified DVD is reproduced. If a command of instructing to reproduce the second video information recorded in the hard disk is described in the DVD reproduction control information, the second video information of Japanese subtitle is reproduced. Then, alpha blending is carried out with respect to the main video image.

Even if the frame rate is different between the first and second video data, blending target, that is, video data are variously broadened so that the foregoing means makes correction of matching the time base between the both data. Various second video images are displayable in a state of being blended with the main video image as a time zone event. Therefore, it is possible to obtain variety and plentiful expression in the display area of the main video image. The foregoing various second video images are previously downloaded, and in addition, video images captured from broadcasting data are usable.

The present invention is not limited to the foregoing embodiment. Components are modified and reduced to practice in a range without departing from the scope of the subject matter of the invention. Various inventions are provided by a proper combination of several components disclosed in the embodiments. For example, some may be deleted from all components disclosed in the embodiments. Components relevant to different embodiments may be properly combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A video data processing apparatus for making time base correction of two video data items when one video image is blended with the other video image, comprising:
   a first video generator generating a first video data having an arbitrary frame rate;
   a second video generator generating a second video data having an arbitrary frame rate different from the first video data; and
   a synchronization controller using video reproduction time managed by the first video generator as a reference time, and using repeatedly the second video data when the frame rate of the second video data output from the second video generator is less than that of the first video data; and
   a frame generating omitting section omitting (or skipping) a generation of a video frame in the second video generator when video generation time of the second video generator is delayed from video generation time of the first video generator.

2. The apparatus according to claim 1, further comprising:
   an alpha blending section using the second video data generated by the second video generator, which includes the first video data and an alpha value for alpha blending, and blending the first and second video data on the alpha value.

3. The apparatus according to claim 1, further comprising:
   a pixel processing section blending the first and second video data at a pixel level.

4. The apparatus according to claim 1, wherein the second video generator decodes coded file contents using the software processing to generate the second video data, and outputs it.

5. The apparatus according to claim 1, wherein a priority setting section is further provided, and video generation by the first video generator is preferentially performed to that of the second video generator.

6. The apparatus according to claim 1, wherein the first video generator is an apparatus for processing video data from an optical disk.

7. The apparatus according to claim 1, wherein the first video generator is an apparatus for processing video data from a receiver.

8. A video data processing method applied to a video data processing apparatus having a first video generator, a second video generator including a graphic controller, and the video data processing apparatus for making time base correction of two video data items when one video image is blended with the other video image, the video data processing method comprising the steps of:
   generating by the first video generator, a first video data having an arbitrary frame rate;
   generating by the second video generator, a second video data having an arbitrary frame rate different from the first video data;
   using video reproduction time managed by the first video generator as a reference time in the second generator, and using repeatedly the second video data when the frame rate of the second video data output from the second video generator is less than that of the first vide data; and
   omitting (or skipping) a generation of a video frame in the second video generator when video generation time of the second video generator is delayed from video generation time of the first vide generator under the control of the graphics controller.

9. The method according to claim 8, wherein blending of the first and second video data is carried out at a pixel level.

* * * * *